United States Patent
Henderson

(10) Patent No.: US 11,671,680 B2
(45) Date of Patent: *Jun. 6, 2023

(54) METADATA MEDIA CONTENT TAGGING

(71) Applicant: DISH Network L.L.C., Englewood, CO (US)

(72) Inventor: Jason Henderson, Littleton, CO (US)

(73) Assignee: DISH Network L.L.C., Englewood, CO (US)

(*) Notice: Subject to any disclaimer, the term of this patent is extended or adjusted under 35 U.S.C. 154(b) by 216 days.

This patent is subject to a terminal disclaimer.

(21) Appl. No.: 17/095,390

(22) Filed: Nov. 11, 2020

(65) Prior Publication Data

US 2021/0067843 A1 Mar. 4, 2021

Related U.S. Application Data

(63) Continuation of application No. 15/912,790, filed on Mar. 6, 2018, now Pat. No. 10,869,105.

(51) Int. Cl.
*G06F 3/048* (2013.01)
*H04N 21/8405* (2011.01)
*H04N 21/231* (2011.01)
*H04N 21/235* (2011.01)
*G10L 15/26* (2006.01)

(52) U.S. Cl.
CPC ..... *H04N 21/8405* (2013.01); *H04N 21/2353* (2013.01); *H04N 21/23109* (2013.01); *G10L 15/26* (2013.01)

(58) Field of Classification Search
None
See application file for complete search history.

(56) References Cited

U.S. PATENT DOCUMENTS

| | | | |
|---|---|---|---|
| 8,978,064 B2* | 3/2015 | Reynolds | H04N 21/4821 725/39 |
| 10,869,105 B2 | 12/2020 | Henderson | |
| 2008/0155627 A1* | 6/2008 | O'Connor | H04N 21/84 348/E7.069 |
| 2009/0076821 A1* | 3/2009 | Brenner | G06F 16/64 707/999.001 |
| 2010/0169786 A1* | 7/2010 | O'Brien | G06F 16/745 715/744 |
| 2010/0180218 A1* | 7/2010 | Boston | G06F 3/0481 715/759 |
| 2011/0185399 A1* | 7/2011 | Webber | G06F 21/62 726/4 |
| 2013/0040629 A1* | 2/2013 | Sprigg | H04N 21/25841 455/419 |
| 2013/0046761 A1* | 2/2013 | Soderberg | G06F 16/48 707/736 |
| 2014/0081633 A1* | 3/2014 | Badaskar | G10L 15/26 707/723 |
| 2014/0101691 A1* | 4/2014 | Sinha | G06F 16/7867 725/32 |

(Continued)

*Primary Examiner* — Seong-Ah A Shin
(74) *Attorney, Agent, or Firm* — Kilpatrick Townsend & Stockton

(57) ABSTRACT

Various arrangements for metadata tagging of video content are presented. A request to add a metadata tag to be linked with a video content instance may be received. A metadata integration database to link the spoken metadata tag with the video content instance may be updated.

20 Claims, 7 Drawing Sheets

(56) References Cited

U.S. PATENT DOCUMENTS

| | | | |
|---|---|---|---|
| 2016/0149956 A1* | 5/2016 | Birnbaum | H04L 63/20 |
| | | | 726/1 |
| 2016/0212488 A1* | 7/2016 | Os | G06F 16/7867 |
| 2016/0253710 A1* | 9/2016 | Publicover | H04N 21/2187 |
| | | | 705/14.66 |
| 2017/0201779 A1* | 7/2017 | Publicover | G06F 16/2358 |
| 2017/0214963 A1* | 7/2017 | Di Franco | H04N 21/4227 |
| 2018/0184154 A1* | 6/2018 | Braskich | H04N 21/4532 |
| 2018/0376205 A1* | 12/2018 | Oswal | H04N 21/4542 |
| 2019/0281366 A1* | 9/2019 | Henderson | H04N 21/8405 |

* cited by examiner

Crashlanding 3
PG-13
127 Minutes
Movies – Action
Age 14+
☆☆☆☆☆

CRASHLANDING III

John Doe and Marty Maniac make a sizzling duo in this dark adaptation of the Crashlanding series. Doe plays a drug addicted passenger who seizes control of a plane from the pilot (played by Maniac) on his last day before retirement.

Tags: *737, Boeing, faulty landing gear, Boston accents, redheads, midair explosions, parachutes,* John Doe, Marty Maniac, Lighthouse Productions You may also like:

Air Force Plane Documentary

The Departed

Watch Live

Record This

Watch On Demand

Add Metadata

FIG. 2

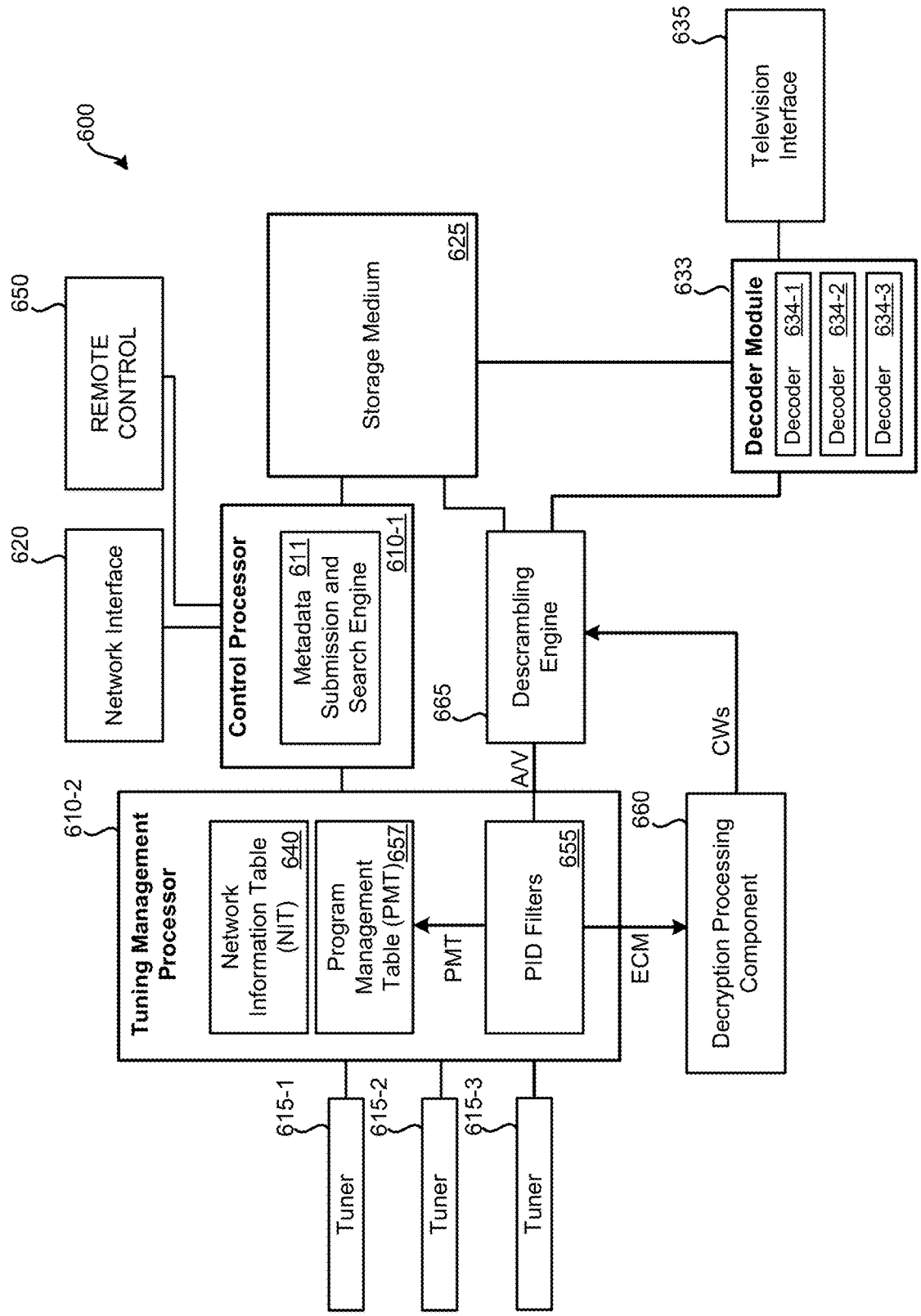

METADATA MEDIA CONTENT TAGGING

CROSS-REFERENCES TO RELATED APPLICATIONS

This application is a continuation of U.S. patent application Ser. No. 15/912,790, filed on Mar. 6, 2018, entitled "Voice-Driven Metadata Media Content Tagging," the disclosure of which is hereby incorporated by reference in its entirety for all purposes.

BACKGROUND

The amount of audio and visual content, such as television programs, movies, documentaries, podcasts, and audio books, has expanded greatly in recent years. With such a large amount of content available, it is easier than ever for consumers to indulge in content that caters to their specific likes. However, despite such a large amount of content being available, it can be difficult for a consumer to determine which content specifically caters to their interests.

SUMMARY

Various embodiments are described related to a method for voice-based metadata tagging of video content. In some embodiments, a method for voice-based metadata tagging of video content is described. The method may include receiving, by a television receiver, via an electronic programming guide (EPG), a request to add a spoken metadata tag to be linked with a video content instance. The method may include receiving, by a television receiver via a microphone integrated as part of a remote control unit, a voice clip. The voice clip may include audio spoken by a user. The method may include transmitting, by the television receiver, the voice clip to a metadata integration server system via the Internet. The method may include performing, by the metadata integration server system, speech-to-text conversion of the voice clip to produce a proposed spoken metadata tag. The method may include transmitting, by the metadata integration server system, the proposed spoken metadata tag to the television receiver. The method may include outputting, by the television receiver, the proposed spoken metadata tag for presentation. The method may include receiving, by the television receiver, from the remote control unit, confirmation of the proposed spoken metadata tag to be the spoken metadata tag. The method may include, in response to the confirmation, updating, by the metadata integration server system, a metadata integration database to link the spoken metadata tag with the video content instance. The method may include receiving, by the metadata integration server system, a content search. The method may include transmitting, by the metadata integration server system, content search results that are indicative of the video content instance. The content search results may be based at least in part on the spoken metadata tag being linked with the video content instance in the metadata integration database. The method may include outputting, by the television receiver, for presentation the content search results.

Embodiments of such a method may include one or more of the following features: Updating the metadata integration database may include determining a number of times that the spoken metadata tag has been submitted for the video content instance. Updating the metadata integration database may include determining that the number times exceeds a minimum tag threshold and linking the spoken metadata tag with the video content instance in response to the number of times being determined to exceed the minimum tag threshold. Updating the metadata integration database may further include determining that the number of times exceeds a presentation threshold and, in response to determining that the number of times exceeds the presentation threshold, updating an EPG entry for the video content instance such that the spoken metadata tag may be visually presented as part of the EPG entry. The method may further include receiving, by the television receiver, selection of the video content instance from the content search results and, in response to the selection of the video content instance from the content search results, outputting, by the television receiver, for presentation the EPG entry for the video content instance such that the spoken metadata tag may be visually presented as part of the EPG entry. Updating the metadata integration database may further include determining that the number of times does not exceed a presentation threshold and, in response to the number of times not exceeding the presentation threshold but exceeding the minimum tag threshold, causing the content search results to include the video content instance, but not visually presenting the spoken metadata tag as part of an EPG entry. The method may further include accessing, by the metadata integration server system, a third-party database that maintains metadata for a plurality of video content instances and updating, by the metadata integration server system, the metadata integration database based on metadata from the third-party database. Performing the speech-to-text conversion of the voice clip to produce the proposed spoken metadata tag may include accessing a third-party database that maintains metadata for a plurality of video content instances. The plurality of video content instances may include the video content instance. The method may include determining a spelling of the proposed spoken metadata tag at least partially based on metadata linked with the video content instance in the third-party database. Performing the speech-to-text conversion of the voice clip to produce the proposed spoken metadata tag may include extracting only nouns from the voice clip to produce the proposed spoken metadata tag. The method may include receiving, by the television receiver, via the EPG, a second request to add a second spoken metadata tag to be linked with a second video content instance. The method may include receiving, by the television receiver via the microphone integrated as part of the remote control unit, a second voice clip. The second voice clip may include audio spoken by a user. The method may include transmitting, by the television receiver, the second voice clip to the metadata integration server system via the Internet. The method may include performing, by the metadata integration server system, a second speech-to-text conversion of the second voice clip to produce a second proposed spoken metadata tag. The method may include transmitting, by the metadata integration server system, the second proposed spoken metadata tag to the television receiver. The method may include outputting, by the television receiver, the second proposed spoken metadata tag for presentation. The method may include receiving, by the television receiver, from the remote control unit, cancelation of the second proposed spoken metadata tag. The method may include, in response to the cancelation, updating, by the metadata integration server system, the metadata integration database to link the second proposed spoken metadata tag with the second video content instance. The second proposed spoken metadata tag is assigned a lower weight due to the cancelation than a higher weight assigned the spoken metadata tag.

In some embodiments, a system for voice-based metadata tagging of video content is described. The system may include a remote control comprising an integrated microphone to capture spoken audio clips. The system may include a television receiver configured to receive, via an electronic programming guide (EPG) interface, a request to add a spoken metadata tag to be linked with a video content instance. The television receiver may be configured to receive, from the remote control, a voice clip. The voice clip may include audio spoken by a user. The television receiver may be configured to transmit the voice clip to a metadata integration server system via the Internet. The system may include the metadata integration server system configured to perform speech-to-text conversion of the voice clip to produce a proposed spoken metadata tag. The metadata integration server system may transmit the proposed spoken metadata tag to the television receiver. The metadata integration server system, in response to a received confirmation, may update a metadata integration database to link the spoken metadata tag with the video content instance. The metadata integration server system may receive a content search. The metadata integration server system may transmit content search results that are indicative of the video content instance. The content search results may be based at least in part on the spoken metadata tag being linked with the video content instance in the metadata integration database. The television receiver may be further configured to output for presentation the content search results.

Embodiments of such a system may include one or more of the following features: The metadata integration server system being configured to update the metadata integration database may include the metadata integration server system being configured to determine a number of times that the spoken metadata tag has been submitted for the video content instance. The system may be configured to determine that the number of times exceeds a minimum tag threshold. The system may be configured to link the spoken metadata tag with the video content instance in response to the number of times being determined to exceed the minimum tag threshold. The metadata integration server system being configured to update the metadata integration database may include the metadata integration server system being configured to determine that the number of times exceeds a presentation threshold. The system, in response to determining that the number of times exceeds the presentation threshold, may update an EPG entry for the video content instance such that the spoken metadata tag may be visually presented as part of the EPG entry. The television receiver may be further configured to receive selection of the video content instance from the content search results and, in response to the selection of the video content instance from the content search results, output for presentation the EPG entry for the video content instance such that the spoken metadata tag may be visually presented as part of the EPG entry. The metadata integration server system being configured to update the metadata integration database may include the metadata integration server system being configured to determine that the number of times does not exceed a presentation threshold and, in response to the number of times not exceeding the presentation threshold but exceeding the minimum tag threshold, may cause the content search results to include the video content instance, but not visually presenting the spoken metadata tag as part of an EPG entry. The metadata integration server system may be further configured to access a third-party database that maintains metadata for a plurality of video content instances and update the metadata integration database based on metadata from the third-party database. The metadata integration server system being configured to perform the speech-to-text conversion of the voice clip to produce the proposed spoken metadata tag may include the metadata integration server system being configured to access a third-party database that maintains metadata for a plurality of video content instances. The plurality of video content instances may include the video content instance and determine a spelling of the proposed spoken metadata tag at least partially based on metadata linked with the video content instance in the third-party database. The metadata integration server system being configured to perform the speech-to-text conversion of the voice clip to produce the proposed spoken metadata tag may include the metadata integration server system being configured to extract only nouns from the voice clip to produce the proposed spoken metadata tag. The television receiver may be further configured to receive, via the EPG, a second request to add a second spoken metadata tag to be linked with a second video content instance. The television receiver may be configured to receive, from the remote control, a second voice clip. The second voice clip may include audio spoken by a user. The television receiver may be configured to transmit the second voice clip to the metadata integration server system via the Internet. The metadata integration server system may be further configured to perform a second speech-to-text conversion of the second voice clip to produce a second proposed spoken metadata tag. The metadata integration server system may transmit the second proposed spoken metadata tag to the television receiver for presentation. The metadata integration server system, in response to a cancelation received from the television receiver, may update the metadata integration database to link the second proposed spoken metadata tag with the second video content instance. The second proposed spoken metadata tag may be assigned a lower weight due to the cancelation than a higher weight assigned the spoken metadata tag.

In some embodiments, an apparatus for voice-based metadata tagging of video content is described. The apparatus may include means for receiving a request to add a spoken metadata tag to be linked with a video content instance. The apparatus may include means for receiving a voice clip. The voice clip may include audio spoken by a user. The apparatus may include means for performing speech-to-text conversion of the voice clip to produce a proposed spoken metadata tag. The apparatus may include means for outputting the proposed spoken metadata tag for presentation. The apparatus may include means for receiving confirmation of the proposed spoken metadata tag to be the spoken metadata tag. The apparatus may include means for updating a metadata integration database to link the spoken metadata tag with the video content instance in response to the confirmation. The apparatus may include means for receiving a content search. The apparatus may include means for providing content search results that are indicative of the video content instance. The content search results may be based at least in part on the spoken metadata tag being linked with the video content instance in the metadata integration database. The apparatus may include means for outputting for presentation the content search results.

Embodiments of such an apparatus may include one or more of the following features: The means for updating the metadata integration database may include means for determining a number of times that the spoken metadata tag has been submitted for the video content instance. The means for updating the metadata integration database may include means for determining that the number of times exceeds a minimum tag threshold. The means for updating the metadata integration database may include means for linking the spoken metadata tag with the video content instance in response to the number of times being determined to exceed the minimum tag threshold.

Various embodiments are described related to a method for voice-based metadata tagging of video content. In some embodiments, a method for voice-based metadata tagging of video content is described. The method may include receiving, by a television receiver, via an electronic programming guide (EPG), a request to add a spoken metadata tag to be linked with a video content instance. The method may include receiving, by a television receiver via a microphone integrated as part of a remote control unit, a voice clip. The voice clip may include audio spoken by a user. The method may include transmitting, by the television receiver, the voice clip to a metadata integration server system via the Internet. The method may include performing, by the metadata integration server system, speech-to-text conversion of the voice clip to produce a proposed spoken metadata tag. The method may include transmitting, by the metadata integration server system, the proposed spoken metadata tag to the television receiver. The method may include outputting, by the television receiver, the proposed spoken metadata tag for presentation. The method may include receiving, by the television receiver, from the remote control unit, confirmation of the proposed spoken metadata tag to be the spoken metadata tag. The method may include, in response to the confirmation, updating, by the metadata integration server system, a metadata integration database to link the spoken metadata tag with the video content instance. The method may include receiving, by the metadata integration server system, a content search. The method may include transmitting, by the metadata integration server system, content search results that are indicative of the video content instance. The content search results may be based at least in part on the spoken metadata tag being linked with the video content instance in the metadata integration database. The method may include outputting, by the television receiver, for presentation the content search results.

Embodiments of such a method may include one or more of the following features: Updating the metadata integration database may include determining a number of times that the spoken metadata tag has been submitted for the video content instance. Updating the metadata integration database may include determining that the number the times exceeds a minimum tag threshold and linking the spoken metadata tag with the video content instance in response to the number of times being determined to exceed the minimum tag threshold. Updating the metadata integration database may further include determining that the number of times exceeds a presentation threshold and, in response to determining that the number of times exceeds the presentation threshold, updating an EPG entry for the video content instance such that the spoken metadata tag may be visually presented as part of the EPG entry. The method may further include receiving, by the television receiver, selection of the video content instance from the content search results and, in response to the selection of the video content instance from the content search results, outputting, by the television receiver, for presentation the EPG entry for the video content instance such that the spoken metadata tag may be visually presented as part of the EPG entry. Updating the metadata integration database may further include determining that the number of times does not exceed a presentation threshold and, in response to the number of times not exceeding the presentation threshold but exceeding the minimum tag threshold, causing the content search results to include the video content instance, but not visually presenting the spoken metadata tag as part of an EPG entry. The method may further include accessing, by the metadata integration server system, a third-party database that maintains metadata for a plurality of video content instances and updating, by the metadata integration server system, the metadata integration database based on metadata from the third-party database. Performing the speech-to-text conversion of the voice clip to produce the proposed spoken metadata tag may include accessing a third-party database that maintains metadata for a plurality of video content instances. The plurality of video content instances may include the video content instance. The method may include determining a spelling of the proposed spoken metadata tag at least partially based on metadata linked with the video content instance in the third-party database. Performing the speech-to-text conversion of the voice clip to produce the proposed spoken metadata tag may include extracting only nouns from the voice clip to produce the proposed spoken metadata tag. The method may include receiving, by the television receiver, via the EPG, a second request to add a second spoken metadata tag to be linked with a second video content instance. The method may include receiving, by the television receiver via the microphone integrated as part of the remote control unit, a second voice clip. The second voice clip may include audio spoken by a user. The method may include transmitting, by the television receiver, the second voice clip to the metadata integration server system via the Internet. The method may include performing, by the metadata integration server system, a second speech-to-text conversion of the second voice clip to produce a second proposed spoken metadata tag. The method may include transmitting, by the metadata integration server system, the second proposed spoken metadata tag to the television receiver. The method may include outputting, by the television receiver, the second proposed spoken metadata tag for presentation. The method may include receiving, by the television receiver, from the remote control unit, cancelation of the second proposed spoken metadata tag. The method may include, in response to the cancelation, updating, by the metadata integration server system, the metadata integration database to link the second proposed spoken metadata tag with the second video content instance. The second proposed spoken metadata tag is assigned a lower weight due to the cancelation than a higher weight assigned the spoken metadata tag.

In some embodiments, a system for voice-based metadata tagging of video content is described. The system may include a remote control comprising an integrated microphone to capture spoken audio clips. The system may include a television receiver configured to receive, via an electronic programming guide (EPG) interface, a request to add a spoken metadata tag to be linked with a video content instance. The television receiver may be configured to receive, from the remote control, a voice clip. The voice clip may include audio spoken by a user. The television receiver may be configured to transmit the voice clip to a metadata integration server system via the Internet. The system may include the metadata integration server system configured to perform speech-to-text conversion of the voice clip to produce a proposed spoken metadata tag. The metadata integration server system may transmit the proposed spoken metadata tag to the television receiver. The metadata integration server system, in response to a received confirmation, may update a metadata integration database to link the spoken metadata tag with the video content instance. The metadata integration server system may receive a content search. The metadata integration server system may transmit content search results that are indicative of the video content instance. The content search results may be based at least in part on the spoken metadata tag being linked with the video content instance in the metadata integration database. The television receiver may be further configured to output for presentation the content search results.

Embodiments of such a system may include one or more of the following features: The metadata integration server system being configured to update the metadata integration database may include the metadata integration server system being configured to determine a number of times that the spoken metadata tag has been submitted for the video content instance. The system may be configured to determine that the number of times exceeds a minimum tag threshold. The system may be configured to link the spoken metadata tag with the video content instance in response to the number of times being determined to exceed the minimum tag threshold. The metadata integration server system being configured to update the metadata integration database may include the metadata integration server system being configured to determine that the number of times exceeds a presentation threshold. The system, in response to determining that the number of times exceeds the presentation threshold, may update an EPG entry for the video content instance such that the spoken metadata tag may be visually presented as part of the EPG entry. The television receiver may be further configured to receive selection of the video content instance from the content search results and, in response to the selection of the video content instance from the content search results, output for presentation the EPG entry for the video content instance such that the spoken metadata tag may be visually presented as part of the EPG entry. The metadata integration server system being configured to update the metadata integration database may include the metadata integration server system being configured to determine that the number of times does not exceed a presentation threshold and, in response to the number of times not exceeding the presentation threshold but exceeding the minimum tag threshold, may cause the content search results to include the video content instance, but not visually presenting the spoken metadata tag as part of an EPG entry. The metadata integration server system may be further configured to access a third-party database that maintains metadata for a plurality of video content instances and update the metadata integration database based on metadata from the third-party database. The metadata integration server system being configured to perform the speech-to-text conversion of the voice clip to produce the proposed spoken metadata tag may include the metadata integration server system being configured to access a third-party database that maintains metadata for a plurality of video content instances. The plurality of video content instances may include the video content instance and determine a spelling of the proposed spoken metadata tag at least partially based on metadata linked with the video content instance in the third-party database. The metadata integration server system being configured to perform the speech-to-text conversion of the voice clip to produce the proposed spoken metadata tag may include the metadata integration server system being configured to extract only nouns from the voice clip to produce the proposed spoken metadata tag. The television receiver may be further configured to receive, via the EPG, a second request to add a second spoken metadata tag to be linked with a second video content instance. The television receiver may be configured to receive, from the remote control, a second voice clip. The second voice clip may include audio spoken by a user. The television receiver may be configured to transmit the second voice clip to the metadata integration server system via the Internet. The metadata integration server system may be further configured to perform a second speech-to-text conversion of the second voice clip to produce a second proposed spoken metadata tag. The metadata integration server system may transmit the second proposed spoken metadata tag to the television receiver for presentation. The metadata integration server system, in response to a cancelation received from the television receiver, may update the metadata integration database to link the second proposed spoken metadata tag with the second video content instance. The second proposed spoken metadata tag may be assigned a lower weight due to the cancelation than a higher weight assigned the spoken metadata tag.

In some embodiments, an apparatus for voice-based metadata tagging of video content is described. The apparatus may include means for receiving a request to add a spoken metadata tag to be linked with a video content instance. The apparatus may include means for receiving a voice clip. The voice clip may include audio spoken by a user. The apparatus may include means for performing speech-to-text conversion of the voice clip to produce a proposed spoken metadata tag. The apparatus may include means for outputting the proposed spoken metadata tag for presentation. The apparatus may include means for receiving confirmation of the proposed spoken metadata tag to be the spoken metadata tag. The apparatus may include means for updating a metadata integration database to link the spoken metadata tag with the video content instance in response to the confirmation. The apparatus may include means for receiving a content search. The apparatus may include means for providing content search results that are indicative of the video content instance. The content search results may be based at least in part on the spoken metadata tag being linked with the video content instance in the metadata integration database. The apparatus may include means for outputting for presentation the content search results.

Embodiments of such a method may include one or more of the following features: The means for updating the metadata integration database may include means for determining a number of times that the spoken metadata tag has been submitted for the video content instance. The means for updating the metadata integration database may include means for determining that the number of times exceeds a minimum tag threshold. The means for updating the metadata integration database may include means for linking the spoken metadata tag with the video content instance in response to the number of times being determined to exceed the minimum tag threshold.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 2 illustrates an embodiment of an electronic programming guide (EPG) that permits proposed audio metadata to be submitted for content.

FIG. 6 illustrates an embodiment of a television receiver.

DETAILED DESCRIPTION

Searching of video and/or audio content, such as television programs, movies, documentaries, radio programs, podcasts, and audio books, may be performed using metadata. Such metadata is typically created for basic facts about a piece of content. For instance, for a movie, typical metadata may include: the movie's title, the genre (e.g., drama, comedy, documentary, sci-fi, etc.), the major actors and actresses, the director, the rating, the year produced, and the production company. Such metadata can help facilitate searching through many pieces of content, such as pieces of content available for viewing from a television service provider. While this metadata may be useful in some instances, it clearly does not capture all of the nuances of the content. As pieces of content are watched by viewers, these viewers may identify particular specific traits of the content that would make sense as a metadata tag. Such traits may be based on the viewers' likes and dislikes and may tend to be fairly specific. For instance, a viewer may identify a movie as having an exciting car chase scene, or, even more specifically, an exciting car chase scene involving an exotic car. As another example, a viewer may identify a movie as having actors and actresses with Boston accents or having a scene shot in Iceland. Such highly specific traits are unlikely to be noted in typical metadata tags for a piece of content. However, by marshalling crowdsourced knowledge, it can be possible to build a metadata database that accurately indicates such specific traits and, in turn, allow for searching of the content based on such traits.

Embodiments detailed herein are directed to allowing content viewers to submit proposed metadata tags via captured audio clips, thus allowing the content viewers to submit proposed metadata tags with minimal effort. The proposed metadata tags are weighted, stored, and ranked using popularity. The most popular viewer-submitted metadata tags may be visually presented as part of an electronic programming guide (EPG) entry for the content. Less popular viewer-submitted tags may be used to produce search results, but may not be visually presented on the accompanying EPG entry. The less popular (the fewer number of times submitted by viewers) a given metadata tag is, the further down in search results the linked content may be presented. Still less popular viewer-submitted tags may be stored, but not used for search results. Such an arrangement may prevent inadvertent or incorrect metadata tags from significantly affecting search results.

Figure 1:
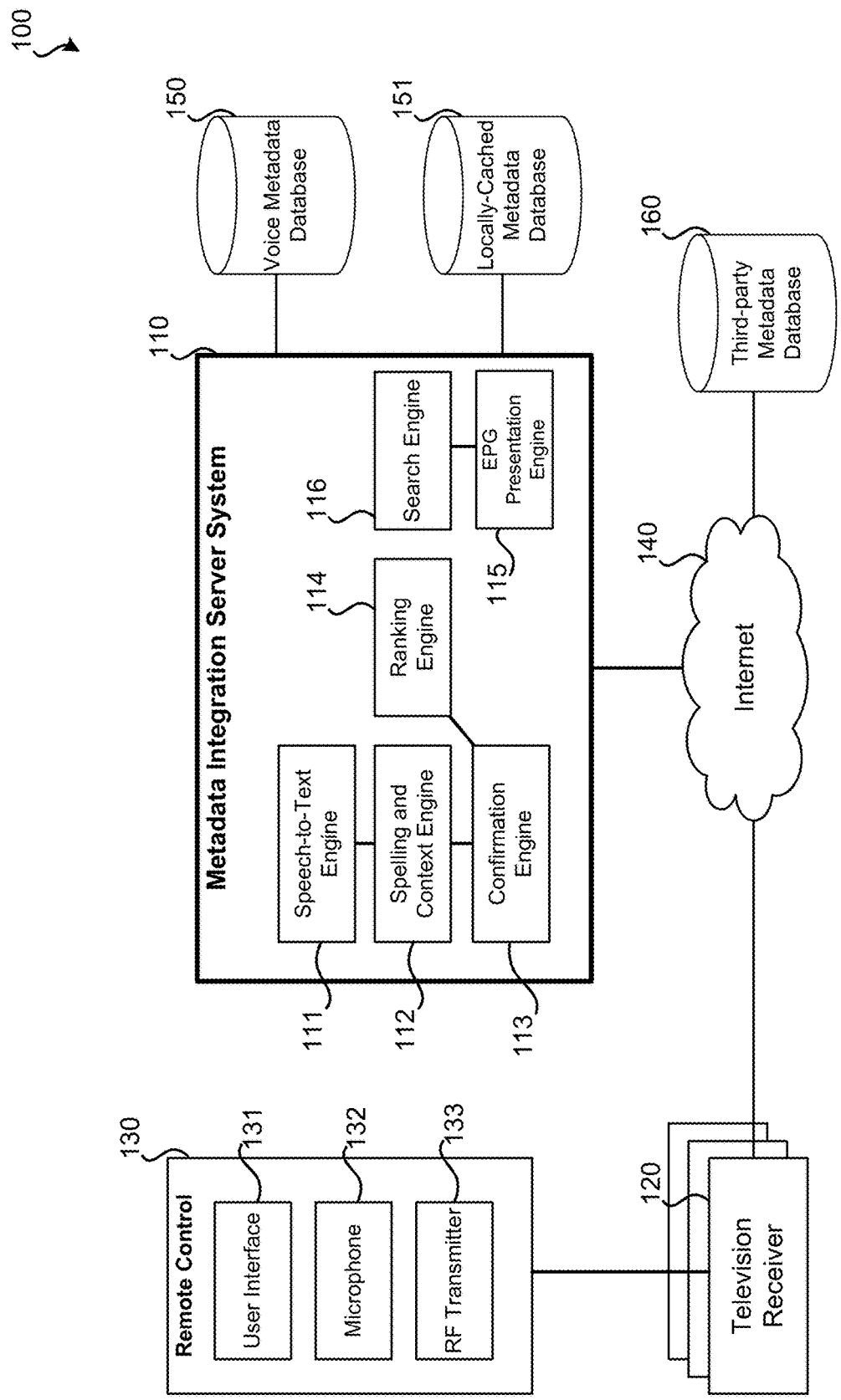
FIG. 1 illustrates an embodiment of an audio metadata integration and search system.

Further detail is provided in relation to the figures. FIG. 1 illustrates an embodiment of an audio metadata integration and search system 100. System 100 can include: metadata integration server system 110, television receiver 120, remote control 130, the Internet 140, voice metadata database 150, locally-cached metadata database 151, and third-party metadata database 160. Various television receivers, possibly numbering in the thousands, may communicate with metadata integration server system 110 via Internet 140 or some other networked arrangement. For simplicity, only a single television receiver 120 is discussed. Further detail regarding the hardware arrangement of television receiver 120 is provided in relation to FIG. 6. Television receiver 120 may use remote control 130 as a user interface that allows a content viewer to interact with television receiver 120 and, in turn, metadata integration server system 110. Remote control 130 may include user interface 131, microphone 132, and RF transmitter 133. User interface 131 includes various buttons that have defined functions or assignable functions, various rotatable wheels, joysticks, accelerometers, gyroscopes, motion sensors, and/or touchpads. Microphone 132 may be activated in response to a command received from television receiver 120 or user input provided to user interface 131. Audio captured by microphone 132 may be transmitted via RF transmitter 133 to television receiver 120. Television receiver 120 may relay audio received from remote control 130 to metadata integration server system 110. In some embodiments, a form of wireless transmitter other than a radio frequency-based wireless transmitter may be used.

Third-party metadata database 160 may represent a metadata database accessible by metadata integration server system 110 and/or directly by television receivers such as television receiver 120, via Internet 140. Third-party metadata database 160 may provide standard, curated metadata for content available from a television service provider, such as a television service provider that operates metadata integration server system 110. Typical pieces of metadata that are provided by third-party metadata database 160 can include: actors and actresses appearing in a piece of content, the rating of a piece of content, the genre of a piece of content, the data production of a piece of content, a synopsis of a piece of content, a director of a piece of content, and a production company of a piece of content. In some embodiments, metadata from third-party metadata database 160 is transmitted to television receivers via a communication arrangement other than Internet 140. For example, in a satellite-based television distribution system, such as that described in FIG. 5, a satellite communication arrangement may be used to transmit content to television receivers, such as television receiver 120. Third-party metadata database 160 may be operated by a different provider than a television service provider that operates metadata integration server system 110. For example, ROVI may operate third-party metadata database 160.

Locally-cached metadata database 151 may store recently accessed metadata from third-party metadata database 160 such that metadata integration server system 110 or television receivers, such as television receiver 120, do not have to directly access third-party metadata database 160. Rather, queries may first be performed against locally-cached metadata database 151 which stores data that was initially obtained from third-party metadata database 160. In some embodiments, locally-cached metadata database 151 may be periodically or occasionally updated.

Metadata integration server system 110 may include various components that are implemented using software, firmware, and/or hardware. Metadata integration server system 110 may include one or more computer server systems that include hardware components such as: hard drives, memory, processors, network interfaces, user interfaces, and communication buses. Metadata integration server system 110 may include: speech to text engine 111, spelling and context engine 112, confirmation engine 113, ranking engine 114, EPG presentation engine 115, and search engine 116. Such engines may be implemented using software or firmware executed by underlying hardware or by special-purpose computerized hardware. In some embodiments, functions of such engines may be combined into fewer software/firmware/hardware components or may be subdivided into a larger number of distinct software/firmware/hardware components.

Speech to text engine 111 may receive audio clips of human speech from a plurality of television receiver's such as television receiver 120 via Internet 140. Speech to text engine 111 may convert the received audio speech clip to editable text. Since the goal is to create one or more content metadata tags, the audio clip may be limited to only several seconds in duration. In some embodiments, a content viewer may be required to record separate audio clips for separate proposed metadata tags. The text created by speech to text engine 111 may tend to have some spelling and/or context errors. For instance, when a user submits a metadata tag referring to an actor or actress, it may be difficult to determine whether the content viewer said "Erin" or "Aaron." However, using spelling and content engine 112, it may be possible to discern what the content viewer likely meant. Spelling and context engine 112 may analyze text output by speech to text engine 111 in comparison with metadata available via third-party metadata database 160 and/or voice metadata database 150. Third-party metadata database 160 may, for instance, list the names of the major actors and actresses for various pieces of content. A word having a low confidence as being correct when converted from audio may be cross-referenced with established metadata from third-party metadata database 160 and/or voice metadata database 150. Referring back to the previous example, if speech to text engine 111 had a low confidence as far as whether a spoken name was "Erin" or "Aaron," but third-party metadata database 160 indicates that one of the major actresses in the movie for which a proposed metadata tag has been submitted is "Erin Doe," the likelihood that the spoken name was "Erin" may increase dramatically. Therefore, the text may be corrected to state "Erin" if "Aaron" was initially transcribed. Spelling and context engine 112 may also alter the phrasing of the submitted audio that has been converted to text. For example, the operator of metadata integration server system 110 may desire to use only nouns as metadata tags. Therefore, words from the created text that are other than a noun may be removed. In some embodiments, only verbs and nouns may be permitted. Such an arrangement may prevent superfluous one or more words from being included as part of a proposed metadata tag.

Following spelling and context engine 112 updating the text output by speech to text engine 111, confirmation engine 113 may output text via Internet 140 to television receiver 120 for presentation. Television receiver 120 may cause a display device, such as a television, to present the proposed text derived by metadata integration server system 110 from the submitted audio clip. A further indication of the content with which the proposed metadata tag is to be linked may be presented thus allowing the content viewer to confirm that the proposed metadata tag is to be linked with the proper piece of content. The content viewer may have the option to accept, cancel, edit, or submit new audio in response to the presented proposed metadata tag. Confirmation engine 113 may submit the proposed metadata tag as a metadata tag to ranking engine 114 or directly to voice metadata database 150 regardless of whether the content viewer confirmed or canceled the proposed metadata tag. In some embodiments, a weighting applied to the metadata tag may be based on whether the content viewer accepted, canceled, edited, or submitted new audio in response to the presented proposed metadata tag. Such actions may be indicative of how much effort is placed into the proposed metadata tag by the content viewer. For example, a weighting of 1 may be applied to an accepted metadata tag, but a weighting of 0.5 may be applied to a canceled metadata tag. A weighting of 1.2 may be applied to an edited metadata tag (such editing could be indicative of a high level of effort being used to create the proposed metadata tag by the content viewer, thus potentially increasing the likelihood that it is accurate).

Ranking engine 114 may serve to rank metadata tags for individual pieces of content based on the number of times that the metadata tag has been submitted. Such an arrangement may only keep instances of the metadata tag submitted by a unique television receiver or user account for a given piece of content. Therefore, if a single content viewer submitted the same metadata tag a large number of times, the ranking of the metadata tag for the given piece of content may not be affected. In some embodiments, ranking engine 114 may receive the metadata tags from confirmation engine 113 and may update voice metadata database 150 as the metadata tags are created. In other embodiments, ranking engine 114 may access voice metadata database 150 and reorganize and/or update entries within the voice metadata database based on popularity. Ranking engine 114 may further take into account the weighting applied by confirmation engine 113. For example, two entries weighted 0.5 may be totaled to equal a single entry with a weighting of 1. Ranking engine 114 may produce, within voice metadata database 150, a listing of metadata tags that have been applied to individual pieces of content.

Voice metadata database 150 may include metadata tags, a linked piece of content, and a popularity value for the metadata tag indicative of the number of times that the metadata tag has been submitted and a weight assigned to the submitted metadata tags. Table 1 illustrates an example embodiment of entries within voice metadata database 150. It should be understood that Table 1 is merely an example and various other ways of organizing metadata tags may be possible.

TABLE 1

| Content ID | Audio-based Metadata Tag | Popularity |
|---|---|---|
| 230498439 | #Boston Accent | 5248 |
| 230498439 | #Exotic Cars | 2027 |
| 393482344 | #Shaky Camera Work | 93 |
| 100293328 | #F-35 | 9001 |

A content identifier may be a unique identifier used to distinguish a piece of content from other pieces of content also listed in voice metadata database 150. In other embodiments, a title of the piece of content may be used in place of the content identifier. Audio-based metadata tags may represent the audio-based metadata tags that have been stored to voice metadata database 150. Popularity may indicate the combined value of a weight and number of times that a particular metadata tag has been submitted to metadata integration server system 110. Voice metadata database 150 may be continually updated or may be periodically updated as part of a batch process based on new submitted metadata tags. In some embodiments, the metadata tags stored to voice metadata database 150 may be occasionally or periodically distributed to television receivers such that the television receivers do not have to use Internet 140 to perform a search of the metadata stored in voice metadata database 150. In other embodiments, the voice metadata of voice metadata database 150 may be maintained remotely from the television receivers by metadata integration server system 110 and may be available for searches by television receivers via Internet 140.

For embodiments in which searches are performed remote from the television receivers at metadata integration server system 110, search engine 116 may be used to perform searches. A television receiver, such as television receiver 120, may submit one or more search strings via Internet 140 to search engine 116. Search engine 116 may search stored metadata in voice metadata database 150, locally-cached metadata database 151, and third-party metadata database 160 for matches or near matches with the search string. Hits within third-party metadata database 160 and locally-cached metadata database 151 may be prioritized above hits within voice metadata database 150. Results returned by search engine 116 may be ordered, at least in part, based on the popularity value associated with metadata tags in voice metadata database 150. Results obtained by search engine 116 may be returned to the submitting television receiver via Internet 140 or via some other communication arrangement.

EPG presentation engine 115 may adjust how pieces of content are indicated in search results and/or within an EPG based on popular metadata tags within voice metadata database 150. For instance, voice metadata tags that have above a defined presentation threshold may be presented visually as part of an EPG listing for the piece of content. In other embodiments, a defined number of popular voice metadata tags for a given piece of content may be presented as part of the EPG listing for that piece of content. Such metadata tags may be listed separately from metadata tags obtained from third-party metadata database 160 or locally-cached metadata database 151.

In some embodiments, various parts the processing performed by metadata integration server system 110 may be performed locally by the television receivers, such as television receiver 120. For example, in some embodiments, speech to text engine 111 may be incorporated as part of television receiver 120. Further, search engine 116 may be incorporated as part of television receiver 120 to perform a search of locally stored metadata that has been received from metadata integration server system 110. Incorporation of other components of metadata integration server system 110 with television receiver 120 may be possible. Additionally or alternatively, microphone 132 may be integrated as part of television receiver 120 rather than as part of remote control 130.

FIG. 2 illustrates an embodiment 200 of an electronic programming guide (EPG) entry for a piece of content that permits proposed audio metadata to be submitted for the piece content. In embodiment 200, an EPG entry for the movie "Crashlanding III" is presented. As part of this EPG entry, a content viewer has the option to select an "add metadata" element. Selection of this element may permit the content viewer to record and submit an audio clip containing one or more proposed metadata tags to metadata integration server system 110. Also indicated as part of the EPG entry are various metadata tags 220. At least some of these metadata tags are based on submitted audio clips from content viewers. In the illustrated embodiment, emphasized tags, such as "737" and "Boston accents" are from audio-based submissions from content viewers. Non-emphasized metadata tags are obtained from other sources, such as a third-party metadata database. For metadata tags that are based on audio-based submission from content viewers to be listed in tags 220, the popularity of these metadata tags must succeed a presentation threshold. Therefore, only the most popular audio-based metadata tags may be visually presented as part of an EPG entry.

Also illustrated as part of embodiment 200 are two content recommendations 230. These two content recommendations 230 may be based on tags 220. As an example, content recommendation 230-1 may also be linked with "Boeing" and "faulty landing gear" metadata tags with a significant popularity. Content recommendation 230-2 may also be linked with the "Boston accent" tag. These two pieces of content may be selected based on a high popularity of the matching tags appearing in "Crashlanding III," "Air Force Plane Documentary," and "The Departed." It should be understood that embodiment 200 is merely an example, alternative elements may be included while other elements may be omitted.

Figure 3A:
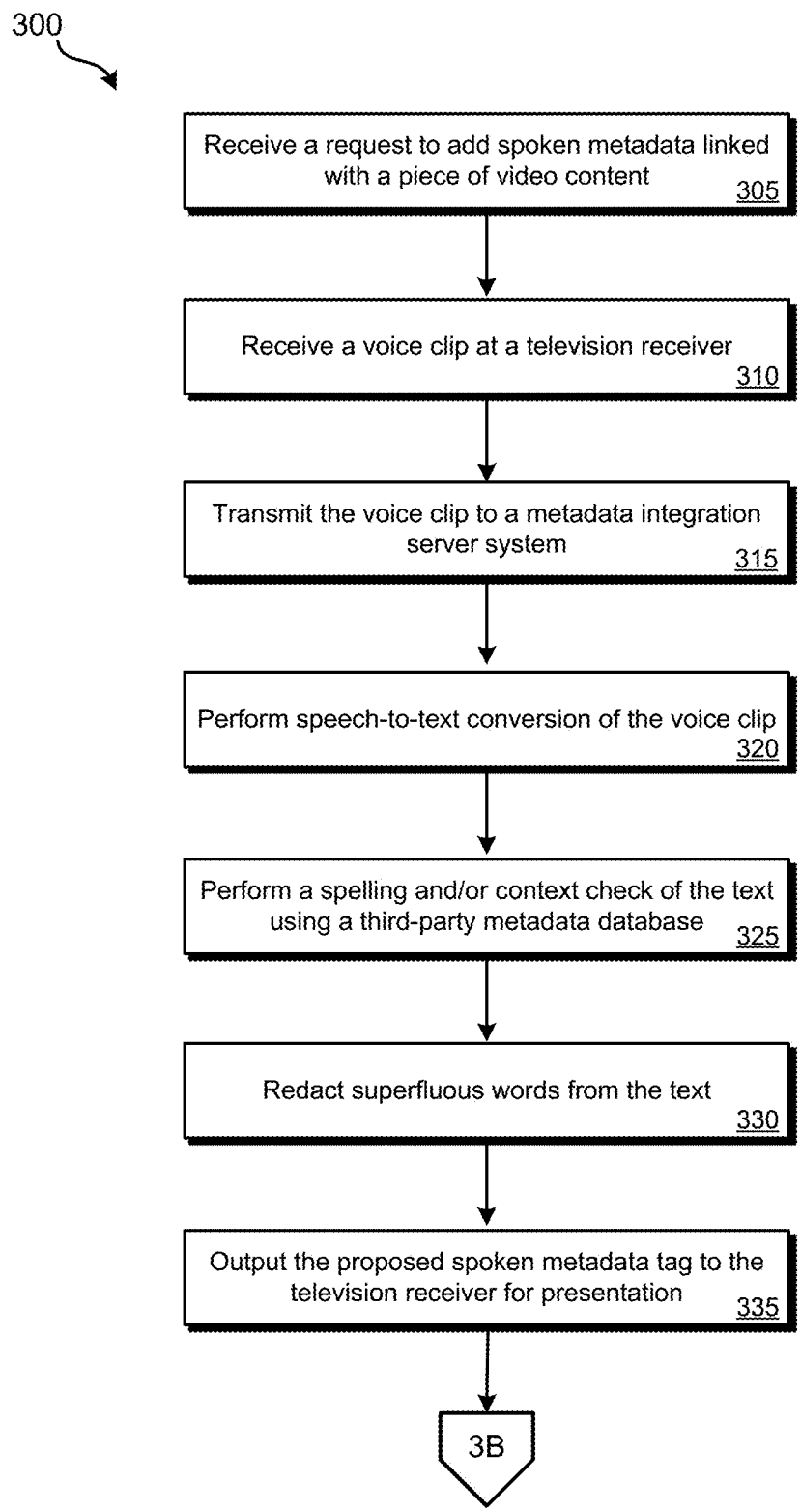
FIGS. 3A and 3B illustrate an embodiment of a method for voice-based metadata tagging of content.
Figure 3B:
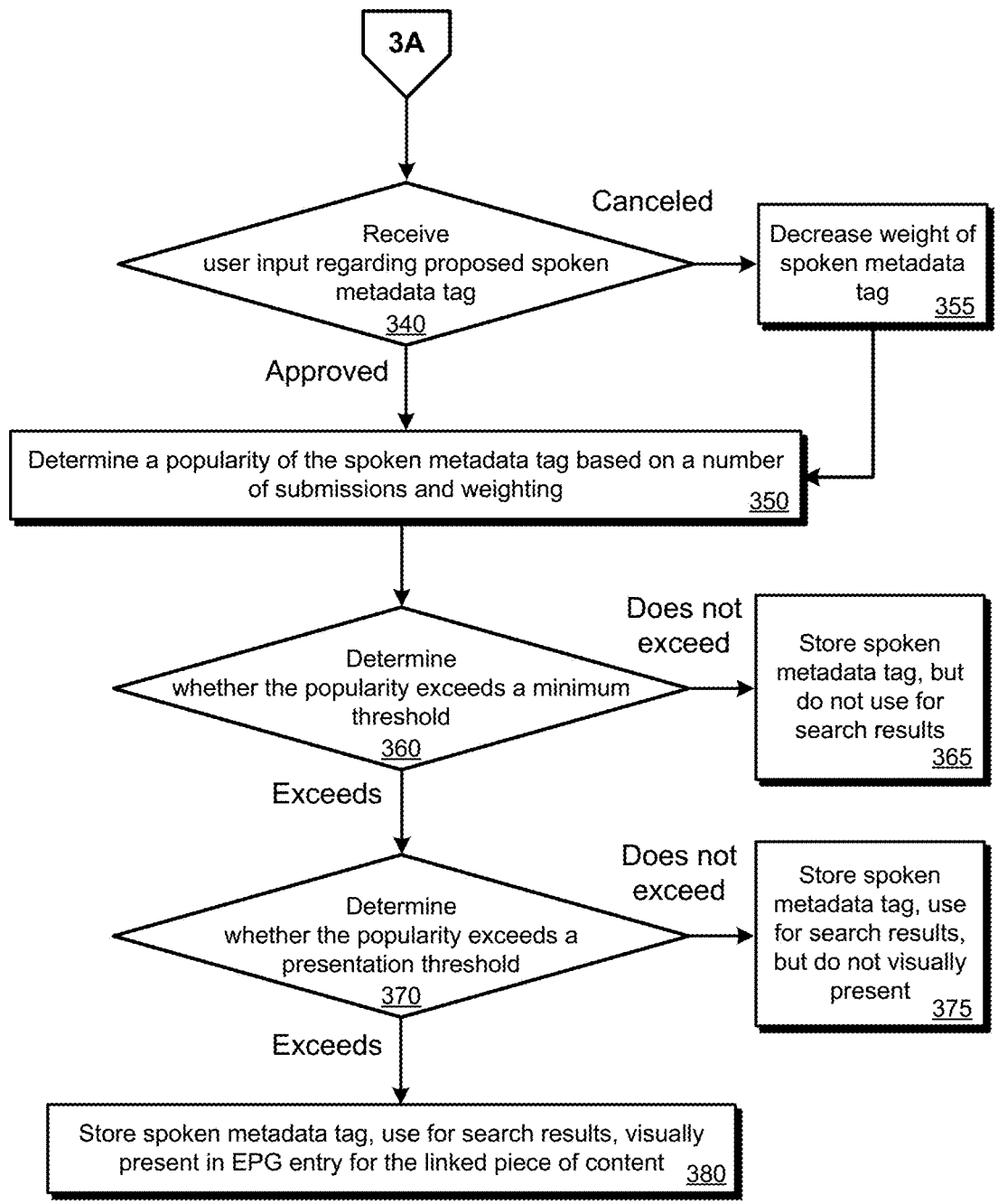

Various methods may be performed using the system of FIG. 1 and the EPG interface of FIG. 2. FIGS. 3A and 3B illustrate an embodiment of a method 300 for voice-based metadata tagging of content. Method 300 may be performed using various components of system 100 of FIG. 1. Additionally or alternatively, method 300 may be performed using the systems and devices of FIGS. 5 and 6. Method 300 begins in FIG. 3A at block 305. At block 305, a request may be received by a television receiver to add spoken metadata to be linked with a particular piece of video content. Referring to FIG. 2, a user may select an "add metadata" visual element presented as part of an EPG entry for a piece of content. In other embodiments, a designated button may be present on a remote control. Use of such a button may result in audio being captured for the currently presented piece of content. At block 310, a voice clip may be received by a microphone of a remote controller television receiver from a content viewer. At block 315, the voice clip may be transmitted to a metadata integration server system. In other embodiments, the voice clip may be analyzed locally by the television receiver rather than being transmitted by the television receiver to the metadata integration server system.

At block 320, speech to text conversion of the voice clip may be performed by the metadata integration server system. In some embodiments, it may be assumed that an entire audio clip is intended to be a single voice-based metadata tag. That is, a content viewer may be required to provide separate clips for multiple voice-based metadata tags. At block 325, a spelling and/or context check of the text that was converted at block 320 may be performed. This check may involve using metadata obtained from a third-party metadata database. Further detail regarding the spelling and/or context check is provided in relation to spelling in context engine 112. As part of block 325, the spelling of particular words may be corrected in accordance with metadata obtained from the third-party metadata database. At block 330, superfluous words may be removed from the text as part of the context check. In some embodiments, only nouns or only nouns and verbs may be desired as part of metadata tags; therefore, words that are not a noun or verb may be removed.

At block 335, the proposed spoken metadata tag, after the processing of blocks 320 through 330 is performed, may be transmitted to the television receiver for presentation to the content viewer. This may allow the content viewer to confirm, edit, or cancel submission of the metadata tag. Editing of the metadata tag may be performed via a graphical user interface that allows a user to select and replace individual characters within the text. Additionally or alternatively, the content viewer may have the option to rerecord an audio clip and perform submission of the proposed metadata clip again.

Method 300 continues in FIG. 3B. At block 340, user input is received regarding the proposed spoken metadata tag. This user input may be transmitted from the television receiver to the metadata integration server system. This user input may specify whether the proposed spoken metadata tag is approved or canceled. If approved, method 300 may proceed to block 350. If not approved, method 300 may proceed to block 355 at which the weight of the spoken metadata tag is decreased. Therefore, the weight of the spoken metadata tag may be less if the metadata tag is canceled at block 340 rather than approved. It should be noted that the metadata tag may still be added to the database if canceled at block 340. As such, the metadata integration system may still be able to leverage canceled submissions to build a voice metadata database. It should further be understood that other user actions besides approval or cancelation may be possible, for example the user may be permitted to edit the proposed metadata tag and then approve or cancel it. Various actions may result in a different weighting being applied to the proposed spoken metadata tag.

At block 350, a popularity of the spoken metadata tag may be determined by the metadata integration server system, which may be based at least in part on the number of submissions of the spoken metadata tag for the piece of content and the weighting applied to each of the spoken metadata tags for the piece of content. One possible way of computing a popularity value at block 350 is to sum all of the number of instances of a particular spoken metadata tag having been received for a particular piece of content, wherein each instance is weighted based on the user input at block 340. If the weighting for an approved metadata tag is 1 and the weighting for a canceled metadata tag is 0.25 and 100 approved instances of the metadata tag are received and 20 instances of the canceled metadata tag are received, the popularity score would be: (1)(100)+(0.25)(20)=105. Therefore, each metadata instance may be multiplied by its weighting and added to the total popularity score. In some embodiments, a weight is not used, but rather the popularity is based on a raw total number of approved submissions of the metadata.

In some embodiments, following block 350, the metadata tag may be stored to a voice metadata database. In other embodiments, further processing may be performed using the metadata tag to determine how the metadata tag should be stored and used by the metadata integration server system. At block 360, it may be determined whether the popularity value calculated at block 350 exceeds a minimum defined threshold. If the popularity does not exceed the minimum threshold, at block 365 the spoken metadata tag may be stored but may not be used for producing future search results. For instance, a spoken metadata tag that has only been received a few times and has a low popularity may not make sense to use to produce search results; however, the metadata tag that has been received hundreds of times may make sense to produce search results.

If block 360 proceeds to block 370, at block 370, it may be determined whether the popularity value calculated at block 350 exceeds a presentation threshold. If the popularity does not exceed the presentation threshold, at block 375 the spoken metadata tag may be stored and used for producing future search results. However, the spoken metadata tag may not be visually presented as part of an EPG entry for the linked piece of content. If block 370 proceeds to block 380, the metadata tag may be used to produce search results, and may visually be presented in the EPG entry for the linked piece of content. In some embodiments, rather than blocks 362, 375 being performed prior to the metadata tag being stored, such steps may be performed on retrieval from the voice metadata database to determine how search results should be structured and EPG entries presented.

Figure 4:
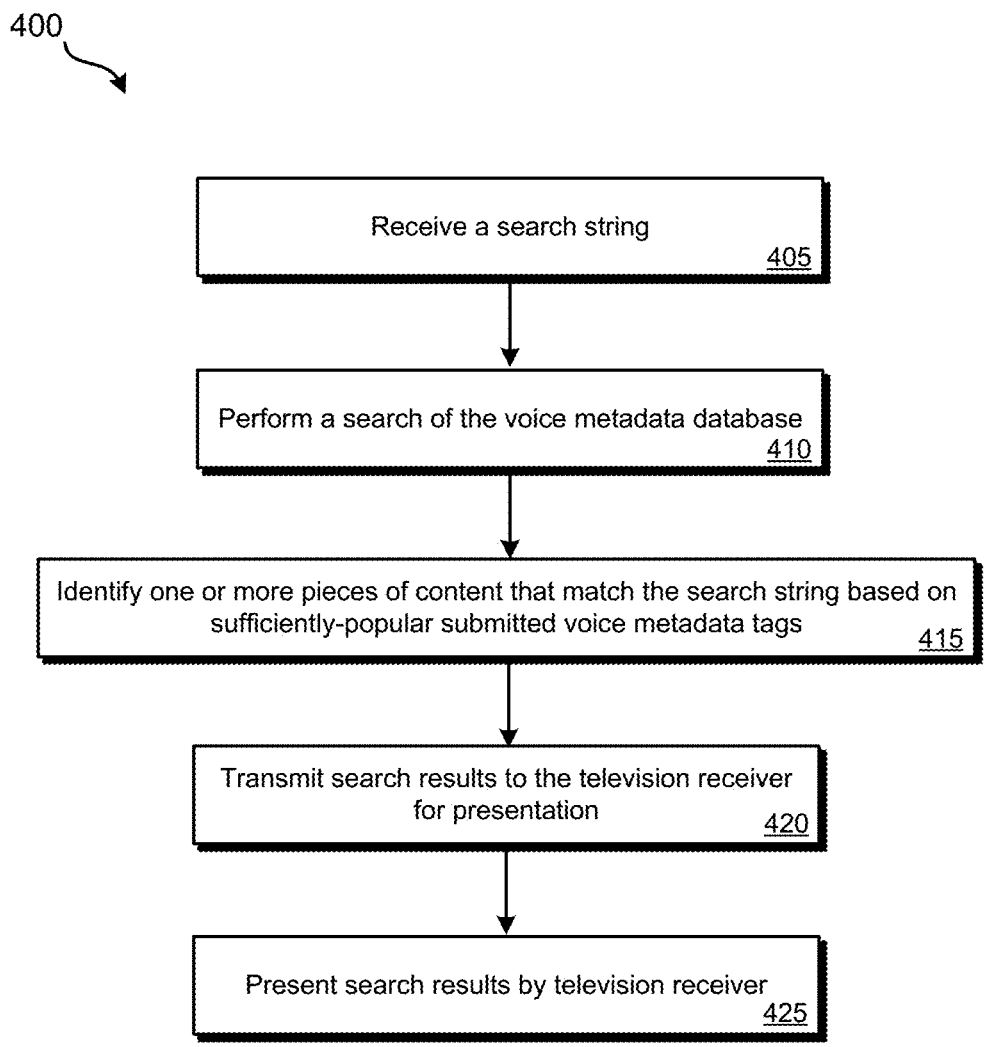
FIG. 4 illustrates an embodiment of a method for searching voice-based metadata tags of content.

FIG. 4 illustrates an embodiment of a method 400 for searching voice-based metadata tags of content. Method 400 may be performed using various components of system 100 of FIG. 1. Additionally or alternatively, method 400 may be performed using the systems and devices of FIGS. 5 and 6. At block 405, a search string may be received from a television receiver. The search string may indicate metadata that a content viewer is attempting to search for. The search string may be submitted through an EPG interface that permits searching of broadcast, pay-per-view, and on-demand content. At block 410, the voice metadata database may be searched. Other metadata databases may be searched also, such as locally-cached metadata database 151 and third-party metadata database 160.

At block 415, one or more pieces of content may be identified that match or partially match the search string. The pieces of content identified at block 415 may be ranked based on the popularity of a metadata tag corresponding to the submitted search string. Therefore, a piece of content associated with the metadata tag that has a high popularity score may be ranked above another piece of content having the same metadata tag that has a lower popularity score. At block 420, search results may be transmitted to the television receiver for presentation. The search results may only include pieces of content that have at least a minimum popularity score associated with the metadata tag that matched the search string. If the popularity is high enough, the metadata tag may be visually presented as part of an EPG entry for the piece of content. At block 425, the search results may be presented by the television receiver and may permit a user to select a search result to view the EPG entry for the selected piece of content.

Figure 5:
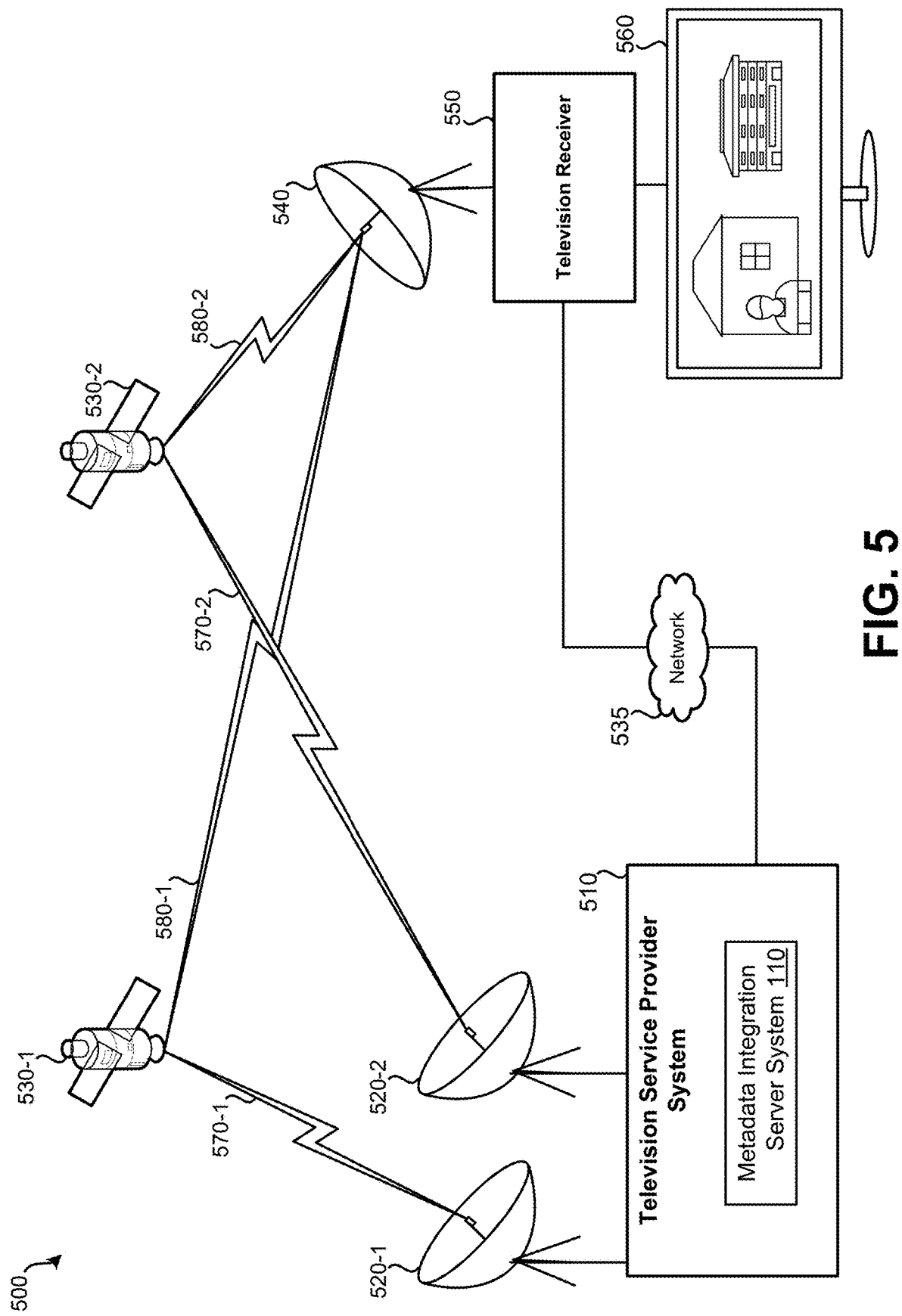
FIG. 5 illustrates an embodiment of a satellite-based television distribution system.

FIG. 5 illustrates an embodiment of a satellite-based television distribution system 500. Such an arrangement may be used for distributing a key, such as a shared symmetrical key, to a television receiver. Satellite-based television distribution system 500 may include: television service provider system 510, satellite transmitter equipment 520, satellites 530, satellite antenna 540, television receiver 550 (which can represent an embodiment of television receiver 120), and display device 560. Alternate embodiments of satellite-based television distribution system 500 may include fewer or greater numbers of components. While only one satellite antenna 540, television receiver 550, and display device 560 (which can collectively be referred to as "user equipment") are illustrated, it should be understood that multiple (e.g., tens, thousands, millions) instances of user equipment may receive television signals from television service provider system 510 via satellites 530.

Television service provider system 510 and satellite transmitter equipment 520 may be operated by a television service provider. A television service provider may distribute television channels, on-demand programming, programming information, and/or other content/services to users. Television service provider system 510 may receive feeds of one or more television channels from various sources. Such television channels may include multiple television channels that contain at least some of the same content (e.g., network affiliates). To distribute television channels for presentation to users, feeds of the television channels may be relayed to user equipment via multiple television distribution satellites.

Each satellite may relay multiple transponder streams. Satellite transmitter equipment 520 (120-1, 520-2) may be used to transmit a feed of one or more television channels from television service provider system 510 to one or more satellites 530. While a single television service provider system 510 and satellite transmitter equipment 520 are illustrated as part of satellite-based television distribution system 500, it should be understood that multiple instances of transmitter equipment may be used, possibly scattered geographically, to communicate with satellites 530. Such multiple instances of satellite transmitting equipment may communicate with the same or with different satellites. Different television channels may be transmitted to satellites 530 from different instances of transmitting equipment. For instance, a different satellite antenna of satellite transmitter equipment 520 may be used for communication with satellites in different orbital slots. Television service provider system 510 may operate metadata integration server system 100, as detailed in relation to FIG. 1. In some embodiments, metadata, including entries from voice metadata database 150, may be broadcast via satellites 530 to television receiver 120 to allow searches to be performed locally. Some television receivers may not be able to communicate via network 535; therefore, to allow such television receivers to perform searches, such metadata may need to be transmitted via satellites 530 for storage locally by the television receivers.

Satellites 530 may be configured to receive signals, such as streams of television channels, from one or more satellite uplinks such as satellite transmitter equipment 520. Satellites 530 may relay received signals from satellite transmitter equipment 520 (and/or other satellite transmitter equipment) to multiple instances of user equipment via transponder streams. Different frequencies may be used for uplink signals 570 from transponder streams 580. Satellites 530 may be in geosynchronous orbit. Each of the transponder streams transmitted by satellites 530 may contain multiple television channels transmitted as packetized data. For example, a single transponder stream may be a serial digital packet stream containing multiple television channels. Therefore, packets for multiple television channels may be interspersed.

Multiple satellites 530 may be used to relay television channels from television service provider system 510 to satellite antenna 540. Different television channels may be carried using different satellites. Different television channels may also be carried using different transponders of the same satellite; thus, such television channels may be transmitted at different frequencies and/or different frequency ranges. As an example, a first and second television channel may be relayed via a first transponder of satellite 530-1. A third, fourth, and fifth television channel may be relayed via a different satellite or a different transponder of the same satellite relaying a transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment. Each transponder stream may be able to carry a finite amount of data. As such, the number of television channels that can be included in a particular transponder stream may be at least partially dependent on the resolution of the video of the television channel. For example, a transponder stream may be able to carry seven or eight television channels at a high resolution, but may be able to carry dozens, fifty, a hundred, two hundred, or some other number of television channels at reduced resolutions.

Satellite antenna 540 may be a piece of user equipment that is used to receive transponder streams from one or more satellites, such as satellites 530. Satellite antenna 540 may be provided to a subscriber for use on a subscription basis to receive television channels provided by the television service provider system 510, satellite transmitter equipment 520, and/or satellites 530. Satellite antenna 540, which may include one or more low noise blocks (LNBs), may be configured to receive transponder streams from multiple satellites and/or multiple transponders of the same satellite. Satellite antenna 540 may be configured to receive television channels via transponder streams on multiple frequencies along with other transmitted data (e.g., encryption keys). Based on the characteristics of television receiver 550 and/or satellite antenna 540, it may only be possible to capture transponder streams from a limited number of transponders concurrently. For example, a tuner of television receiver 550 may only be able to tune to a single transponder stream from a transponder of a single satellite at a given time. The tuner can then be re-tuned to another transponder of the same or a different satellite. A television receiver 550 having multiple tuners may allow for multiple transponder streams to be received at the same time.

In communication with satellite antenna 540 may be one or more television receivers. Television receivers may be configured to decode signals received from satellites 530 via satellite antenna 540 for output and presentation via a display device, such as display device 560. A television receiver may be incorporated as part of a television or may be part of a separate device, commonly referred to as a set-top box (STB). Television receiver 550 may decode signals received via satellite antenna 540 and provide an output to display device 560. FIG. 6 provides additional detail of various embodiments of a television receiver. A television receiver is defined to include STBs and also circuitry having similar functionality that may be incorporated with another device. For instance, circuitry similar to that of a television receiver may be incorporated as part of a television. As such, while FIG. 5 illustrates an embodiment of television receiver 550 as separate from display device 560, it should be understood that, in other embodiments, similar functions may be performed by a television receiver integrated with display device 560.

Display device 560 may be used to present video and/or audio decoded and output by television receiver 550. Television receiver 550 may also output a display of one or more interfaces to display device 560, such as an electronic programming guide (EPG). In many embodiments, display device 560 is a television. Display device 560 may also be a monitor, computer, or some other device configured to display video and, possibly, play audio.

Uplink signal 570-1 represents a signal between satellite transmitter equipment 520 and satellite 530-1. Uplink signal 570-2 represents a signal between satellite transmitter equipment 520 and satellite 530-2. Each of uplink signals 570 may contain streams of one or more different television channels. For example, uplink signal 570-1 may contain a first group of television channels, while uplink signal 570-2 contains a second group of television channels. Each of these television channels may be scrambled such that unauthorized persons are prevented from accessing the television channels.

Transponder stream 580-1 represents a transponder stream signal between satellite 530-1 and satellite antenna 540. Transponder stream 580-2 represents a transponder stream signal between satellite 530-2 and satellite antenna 540. Each of transponder streams 580 may contain one or more different television channels, which may be at least partially scrambled. For example, transponder stream 580-1 may be a first transponder stream containing a first group of television channels, while transponder stream 580-2 may be a second transponder stream containing a different group of television channels. When a television channel is received as part of a transponder stream and is decoded and output to display device 560 (rather than first storing the television channel to a storage medium as part of DVR functionality, then later outputting the television channel from the storage medium), the television channel may be considered to be viewed "live."

FIG. 5 illustrates transponder stream 580-1 and transponder stream 580-2 being received by satellite antenna 540 and distributed to television receiver 550. For a first group of television channels, satellite antenna 540 may receive transponder stream 580-1 and for a second group of channels, transponder stream 580-2 may be received. Television receiver 550 may decode the received transponder streams. As such, depending on which television channels are desired to be presented or stored, various transponder streams from various satellites may be received, descrambled, and decoded by television receiver 550.

Network 535, which can be the Internet, may serve as a secondary communication channel between television service provider system 510 and television receiver 550. Via such a secondary communication channel, bidirectional exchange of data may occur. As such, data may be transmitted to television service provider system 510 from television receiver 550 via network 535. Data may also be transmitted from television service provider system 510 to television receiver 550 via network 535.

FIG. 6 illustrates an embodiment of television receiver 600. It should be understood that television receiver 600 can represent a more detailed embodiment of television receiver 120. Television receiver 600 may be configured to provide an interface such as in FIG. 2 that allows for submission and use of audio-based metadata tags. Television receiver 600 may be in the form of a separate device configured to be connected with a display device, such as a television. Embodiments of television receiver 600 can include set top boxes (STBs). As previously noted, in addition to being in the form of an STB, a television receiver may be incorporated as part of another device, such as a television or other form of display device. For example, a television may have an integrated television receiver (which does not involve an external STB being coupled with the television).

Television receiver 600 may represent television receiver 120 of FIG. 1 and may be in the form of an STB that outputs video and/or audio to a display device, such as a television. Television receiver 600 may be incorporated as part of a television, such as display device 560 of FIG. 5. Television receiver 600 may include: processors 610 (which may include control processor 610-1, tuning management processor 610-2, and possibly additional processors), tuners 615, network interface 620, non-transitory computer-readable storage medium 625, electronic programming guide (EPG) database 630, television interface 635, networking information table (NIT) 640, digital video recorder (DVR) database 645 (which may include provider-managed television programming storage and/or user-defined television programming), remote control 650, decryption processing component 660 (which can be in the form of a removable or non-removable smartcard), and/or descrambling engine 665. In other embodiments of television receiver 600, fewer or greater numbers of components may be present. It should be understood that the various components of television receiver 600 may be implemented using hardware, firmware, software, and/or some combination thereof. Functionality of components may be combined; for example, functions of descrambling engine 665 may be performed by tuning management processor 610-2. Further, functionality of components may be spread among additional components; for example, PID (packet identifier) filters 655 may be handled by separate hardware from program management table (PMT) 657.

Processors 610 may include one or more specialized and/or general-purpose processors configured to perform processes such as tuning to a particular channel, accessing and displaying EPG information from an EPG database, and/or receiving and processing input from a user. For example, processors 610 may include one or more processors dedicated to decoding video signals from a particular format, such as MPEG, for output and display on a television and for performing decryption. It should be understood that the functions performed by various modules of FIG. 6 may be performed using one or more processors. As such, for example, functions of descrambling engine 665 may be performed by control processor 610-1.

Control processor 610-1 may communicate with tuning management processor 610-2. Control processor 610-1 may control the recording of television channels based on timers stored in a DVR database. Control processor 610-1 may also provide commands to tuning management processor 610-2 when recording of a television channel is to cease. In addition to providing commands relating to the recording of television channels, control processor 610-1 may provide commands to tuning management processor 610-2 that indicate television channels to be output to decoder module 633 for output to a display device. Control processor 610-1 may also communicate with network interface 620 and remote control 650. Control processor 610-1 may handle incoming data from network interface 620 and remote control 650. Additionally, control processor 610-1 may be configured to output data via network interface 620. Control processor 610-1 may include a metadata submission and search engine 611. Search engine 611 may permit metadata to be submitted to a remote server via remote control 650 and allow searches to be performed based on locally-stored metadata or remotely-accessible metadata.

Tuners 615 may include one or more tuners used to tune to transponders that include broadcasts of one or more television channels. In the illustrated embodiment of television receiver 600, three tuners are present (tuner 615-1, tuner 615-2, and tuner 615-3). In other embodiments, two or more than three tuners may be present, such as four, six, or eight tuners. Each tuner contained in tuners 615 may be capable of receiving and processing a single transponder stream from a satellite transponder at a given time. As such, a single tuner may tune to a single transponder stream at a given time. If tuners 615 include multiple tuners, one tuner may be used to tune to a television channel on a first transponder stream for display using a television, while another tuner may be used to tune to a television channel on a second transponder for recording and viewing at some other time. If multiple television channels transmitted on the same transponder stream are desired, a single tuner of tuners 615 may be used to receive the signal containing the multiple television channels for presentation and/or recording. Tuners 615 may receive commands from tuning management processor 610-2. Such commands may instruct tuners 615 which frequencies or transponder streams to tune.

Network interface 620 may be used to communicate via an alternate communication channel with a television service provider, if such communication channel is available. The primary communication channel may be via satellite (which may be unidirectional to television receiver 600) and the alternate communication channel (which may be bidirectional) may be via a network, such as the Internet. Referring back to FIG. 5, television receiver 550 may be able to communicate with television service provider system 510 via a network, such as the Internet. This communication may be bidirectional: data may be transmitted from television receiver 550 to television service provider system 510 and from television service provider system 510 to television receiver 550. Referring back to FIG. 6, network interface 620 may be configured to communicate via one or more networks, such as the Internet, to communicate with television service provider system 510 of FIG. 5. Information may be transmitted and/or received via network interface 620. For instance, instructions (e.g., regarding subscription portability, MCVE definitions) from a television service provider may also be received via network interface 620, if connected with the Internet. Network interface 620 may be used to provide a confirmation to a television service provider that instructions received from the television service provider have indeed been executed.

Storage medium 625 may represent one or more non-transitory computer-readable storage mediums. Storage medium 625 may include memory and/or a hard drive. Storage medium 625 may be used to store information received from one or more satellites and/or information received via network interface 620. Storage medium 625 may store information related to EPG entries, recorded content, and/or on-demand programming. Recorded television programs, which were recorded based on a provider- or user-defined timer may be stored using storage medium 625 as part of a DVR database. Storage medium 625 may be partitioned or otherwise divided (such as into folders) such that predefined amounts of storage medium 625 are devoted to storage of television programs recorded due to user-defined timers and stored television programs recorded due to provider-defined timers.

The network information table (NIT) 640 may store information used by television receiver 600 to access various television channels. NIT 640 may be stored locally by a processor, such as tuning management processor 610-2 and/or by storage medium 625. Information used to populate NIT 640 may be received via satellite (or cable) through tuners 615 and/or may be received via network interface 620 from the television service provider. As such, information present in NIT 640 may be periodically updated. In some embodiments, NIT 640 may be locally-stored by television receiver 600 using storage medium 625. Generally, NIT 640 may store information about a service provider network, such as a satellite-based service provider network. Information that may be present in NIT 640 may include: television channel numbers, satellite identifiers (which may be used to ensure different satellites are tuned to for reception of timing signals), frequency identifiers and/or transponder identifiers for various television channels. In some embodiments, NIT 640 may contain additional data or additional tables may be stored by the television receiver. For example, while specific audio PIDs and video PIDs may not be present in NIT 640, a channel identifier may be present within NIT 640 which may be used to look up the audio PIDs and video PIDs in another table, such as a program map table (PMT). In some embodiments, a PID associated with the data for the PMT is indicated in a separate table, program association table (PAT), which is not illustrated in FIG. 6. A PAT may be stored by the television receiver in a similar manner to the NIT. For example, a PMT may store information on audio PIDs, and/or video PIDs. A PMT stores data on ECM (entitlement control message) PIDs for television channels that are transmitted on a transponder frequency. If, for a first television channel, multiple television channels are to be tuned to, NIT 640 and/or PMT 657 may indicate a second television channel that is to be tuned to when a first channel is tuned to.

Based on information in the NIT, it may be possible to determine the proper satellite and transponder to which to tune for a particular television channel. In some embodiments, the NIT may list a particular frequency to which to tune for a particular television channel. Once tuned to the proper satellite/transponder/frequency, the PMT PID may be used to retrieve a program management table that indicates the PIDs for audio and video streams of television channels transmitted by that transponder.

Decoder module 633 may serve to convert encoded video and audio into a format suitable for output to a display device. For instance, decoder module 633 may receive MPEG video and audio from storage medium 625 or descrambling engine 665 to be output to a television. MPEG video and audio from storage medium 625 may have been recorded to DVR database 645 as part of a previously-recorded television program. Decoder module 633 may convert the MPEG video and audio into a format appropriate to be displayed by a television or other form of display device and audio into a format appropriate to be output from speakers, respectively. Decoder module 633 may have the ability to convert a finite number of television channel streams received from storage medium 625 or descrambling engine 665 simultaneously. For instance, each of decoders 634 within decoder module 633 may be able to only decode a single television channel at a time. While decoder module 633 is illustrated as having three decoders 634 (decoder 634-1, decoder 634-2, and decoder 634-3), in other embodiments, a greater or fewer number of decoders may be present in television receiver 600.

Television interface 635 may serve to output a signal to a television (or another form of display device) in a proper format for display of video and playback of audio. As such, television interface 635 may output one or more television channels, stored television programming from storage medium 625 (e.g., television programs from DVR database, television programs from on-demand programming and/or information from a locally-stored EPG database) to a television for presentation.

Digital Video Recorder (DVR) functionality may permit a television channel to be recorded for a period of time. DVR functionality of television receiver 600 may be managed by control processor 610-1. Control processor 610-1 may coordinate the television channel, start time, and stop time of when recording of a television channel is to occur. DVR database 645 may store information related to the recording of television channels. DVR database 645 may store timers that are used by control processor 610-1 to determine when a television channel should be tuned to and its programs recorded to DVR database 645 of storage medium 625. In some embodiments, a limited amount of storage medium 625 may be devoted to DVR database 645. Timers may be set by the television service provider and/or one or more users of television receiver 600.

DVR database 645 may also be used to record recordings of service provider-defined television channels. For each day, an array of files may be created. For example, based on provider-defined timers, a file may be created for each recorded television channel for a day. For example, if four television channels are recorded from 6-10 PM on a given day, four files may be created (one for each television channel). Within each file, one or more television programs may be present. The service provider may define the television channels, the dates, and the time periods for which the television channels are recorded for the provider-defined timers. The provider-defined timers may be transmitted to television receiver 600 via the television provider's network. For example, referring to satellite-based television distribution system 500 of FIG. 5, in a satellite-based television service provider system, data necessary to create the provider-defined timers at television receiver 550 may be received via satellite.

As an example of DVR functionality of television receiver 600 being used to record based on provider-defined timers, a television service provider may configure television receiver 600 to record television programming on multiple, predefined television channels for a predefined period of time, on predefined dates. For instance, a television service provider may configure television receiver 600 such that television programming may be recorded from 6 to 10 PM on NBC, ABC, CBS, and FOX on each weeknight and from 6 to 10 PM on each weekend night on the same channels. These channels may be transmitted as part of a single transponder stream such that only a single tuner needs to be used to receive the television channels. Packets for such television channels may be interspersed and may be received and recorded to a file. If a television program is selected for recording by a user and is also specified for recording by the television service provider, the user selection may serve as an indication to save the television program for an extended time (beyond the time which the predefined recording would otherwise be saved). Television programming recorded based on provider-defined timers may be stored to a portion of storage medium 625 for provider-managed television programming storage.

Remote control 650 (physically separate from television receiver 600) may allow a user to interact with television receiver 600. Remote control 650 may be used to select a television channel for viewing, record audio clips via an on-board microphone, view information from an EPG database, and/or program a timer stored to DVR database 645. In some embodiments, it may be possible to load some or all of preferences to a remote control. As such, the remote control can serve as a backup storage device for the preferences.

Referring back to tuners 615, television channels received via satellite (or cable) may contain at least some scrambled data. Packets of audio and video may be scrambled to prevent unauthorized users (e.g., nonsubscribers) from receiving television programming without paying the television service provider. When a tuner of tuners 615 is receiving data from a particular transponder of a satellite, the transponder stream may be a series of data packets corresponding to multiple television channels. Each data packet may contain a packet identifier (PID), which, in combination with NIT 640 and/or PMT 657, can be determined to be associated with a particular television channel. Particular data packets, referred to as entitlement control messages (ECMs), may be periodically transmitted. ECMs may be associated with another PID and may be encrypted; television receiver 600 may use decryption engine 661 of decryption processing component 660 to decrypt ECMs. Decryption of an ECM may only be possible if the user has authorization to access the particular television channel associated with the ECM. When an ECM is determined to correspond to a television channel being stored and/or displayed, the ECM may be provided to decryption processing component 660 for decryption. A special addressed packet or series of packets may be used to transmit a key to television receiver 600 for storage and/or distribution to a VR device.

When decryption processing component 660 receives an encrypted ECM, decryption processing component 660 may decrypt the ECM to obtain some number of control words. In some embodiments, from each ECM received by decryption processing component 660, two control words are obtained. In some embodiments, when decryption processing component 660 receives an ECM, it compares the ECM to the previously received ECM. If the two ECMs match, the second ECM is not decrypted because the same control words would be obtained. In other embodiments, each ECM received by decryption processing component 660 is decrypted; however, if a second ECM matches a first ECM, the outputted control words will match; thus, effectively, the second ECM does not affect the control words output by decryption processing component 660. Decryption processing component 660 may be permanently part of television receiver 600 or may be configured to be inserted and removed from television receiver 600.

Tuning management processor 610-2 may be in communication with tuners 615 and control processor 610-1. Tuning management processor 610-2 may be configured to receive commands from control processor 610-1. Such commands may indicate when to start/stop recording a television channel and/or when to start/stop causing a television channel to be output to a television. Tuning management processor 610-2 may control tuners 615. Tuning management processor 610-2 may provide commands to tuners 615 that instruct the tuners which satellite, transponder, and/or frequency to tune to. From tuners 615, tuning management processor 610-2 may receive transponder streams of packetized data. As previously detailed, some or all of these packets may include a PID that identifies the content of the packet.

Tuning management processor 610-2 may be configured to create one or more PID filters 655 that sort packets received from tuners 615 based on the PIDs. When a tuner is initially tuned to a particular frequency (e.g., to a particular transponder of a satellite), a PID filter may be created based on the PMT data. The PID filter created, based on the PMT data packets, may be known because it is stored as part of NIT 640 or another table, such as a program association table (PAT). From the PMT data packets, PMT may be constructed by tuning management processor 610-2.

PID filters 655 may be configured to filter data packets based on PIDs. In some embodiments, PID filters 655 are created and executed by tuning management processor 610-2. For each television channel to be output for presentation or recorded, a separate PID filter may be configured. In other embodiments, separate hardware may be used to create and execute such PID filters. Depending on a television channel selected for recording/viewing, a PID filter may be created to filter the video and audio packets associated with the television channel (based on the PID assignments present in PMT 657). For example, if a transponder data stream includes multiple television channels, data packets corresponding to a television channel that is not desired to be stored or displayed by the user may be ignored by PID filters 655. As such, only data packets corresponding to the one or more television channels desired to be stored and/or displayed may be filtered and passed to either descrambling engine 665 or decryption processing component 660; other data packets may be ignored. For each television channel, a stream of video packets, a stream of audio packets (one or both of the audio programs) and/or a stream of ECM packets may be present, each stream identified by a PID. In some embodiments, a common ECM stream may be used for multiple television channels. Additional data packets corresponding to other information, such as updates to NIT 640, may be appropriately routed by PID filters 655. At a given time, one or multiple PID filters may be executed by tuning management processor 610-2.

Descrambling engine 665 may use the control words output by decryption processing component 660 in order to descramble video and/or audio corresponding to television channels for storage and/or presentation. Video and/or audio data contained in the transponder data stream received by tuners 615 may be scrambled. Video and/or audio data may be descrambled by descrambling engine 665 using a particular control word. Which control word output by decryption processing component 660 to be used for successful descrambling may be indicated by a scramble control identifier present within the data packet containing the scrambled video or audio. Descrambled video and/or audio may be output by descrambling engine 665 to storage medium 625 for storage (in DVR database 645) and/or to decoder module 633 for output to a television or other presentation equipment via television interface 635.

For simplicity, television receiver 600 of FIG. 6 has been reduced to a block diagram; commonly known parts, such as a power supply, have been omitted. Further, some routing between the various modules of television receiver 600 has been illustrated. Such illustrations are for exemplary purposes only. The state of two modules not being directly or indirectly connected does not indicate the modules cannot communicate. Rather, connections between modules of the television receiver 600 are intended only to indicate possible common data routing. It should be understood that the modules of television receiver 600 may be combined into a fewer number of modules or divided into a greater number of modules. Further, the components of television receiver 600 may be part of another device, such as built into a television.

It should be understood that television receiver 600, along with the other computerized systems and devices detailed herein, may include various computerized components including memories, processors, data buses, user interfaces, power supplies, etc. Such components have been omitted from the description and figures for simplicity.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for metadata tagging of video content, the method comprising:
   updating, by a metadata integration server system, a crowdsourced metadata integration database to link a metadata tag with a video content instance, wherein updating the crowdsourced metadata integration database comprises:
      determining a number of times that the metadata tag has been submitted for the video content instance;
      determining that the number of times exceeds a minimum tag threshold; and
      linking the metadata tag with the video content instance in response to the number of times being determined to exceed the minimum tag threshold;
      determining that the number of times exceeds a presentation threshold; and
      in response to determining that the number of times exceeds the presentation threshold, updating an electronic programming guide (EPG) entry for the video content instance such that the metadata tag is visually presented as part of the EPG entry;
   receiving, by the metadata integration server system, a content search; and
   transmitting, by the metadata integration server system, content search results that are indicative of the video content instance, wherein the content search results are based at least in part on the metadata tag being linked with the video content instance in the crowdsourced metadata integration database.

2. The method for voice-based metadata tagging of video content of claim 1, wherein the metadata integration server system updates the crowdsourced metadata integration database based on metadata tags submitted by a plurality of content viewers via a plurality of television receivers.

3. The method for voice-based metadata tagging of video content of claim 2, the method further comprising:

outputting, by a television receiver of the plurality of television receivers, the content search results for presentation.

4. The method for voice-based metadata tagging of video content of claim 1, wherein the metadata tag is a spoken metadata tag that was submitted by a content viewer via a microphone.

5. The method for voice-based metadata tagging of video content of claim 1, the method further comprising:
receiving, by a television receiver, via an EPG interface, a request to add a metadata tag to be linked with the video content instance.

6. The method for voice-based metadata tagging of video content of claim 5, the method further comprising:
receiving, by the television receiver via a microphone integrated as part of a remote control unit, a voice clip, wherein the voice clip comprises audio spoken by a user; and
transmitting, by the television receiver, the voice clip to the metadata integration server system.

7. The method for voice-based metadata tagging of video content of claim 6, the method further comprising:
outputting, by the television receiver, a proposed spoken metadata tag for presentation; and
receiving, by the television receiver, confirmation of the proposed spoken metadata tag to be the metadata tag.

8. The method for voice-based metadata tagging of video content of claim 3, the method further comprising:
receiving, by the television receiver, selection of the video content instance from the content search results; and
in response to the selection of the video content instance from the content search results, outputting, by the television receiver, for presentation the EPG entry for the video content instance such that the metadata tag is visually presented as part of the EPG entry.

9. The method for voice-based metadata tagging of video content of claim 3, the method further comprising:
determining, for a second metadata tag, that the number of times does not exceed the presentation threshold; and
in response to the number of times not exceeding the presentation threshold but exceeding the minimum tag threshold for the second metadata tag, causing the content search results to include a second video content instance mapped to the second metadata tag, but not visually presenting the second metadata tag as part of an EPG entry for the second video content instance.

10. The method for voice-based metadata tagging of video content of claim 1, the method further comprising:
accessing, by the metadata integration server system, a third-party database that maintains metadata for a plurality of video content instances; and
updating, by the metadata integration server system, the crowdsourced metadata integration database based on metadata from the third-party database.

11. A system for voice-based metadata tagging of video content, the system comprising:
a metadata integration server system, comprising one or more memories and one or more processors, that maintains a crowdsourced metadata integration database updated based on submitted metadata tags, the one or more processors of the metadata integration server system being configured to:
update the crowdsourced metadata integration database to link a metadata tag with a video content instance, wherein updating the crowdsourced metadata integration database comprises the metadata integration server system being configured to:
determine a number of times that the metadata tag has been submitted for the video content instance;
determine that the number of times exceeds a minimum tag threshold;
link the metadata tag with the video content instance in response to the number of times being determined to exceed the minimum tag threshold;
determine that the number of times exceeds a presentation threshold; and
in response to determining that the number of times exceeds the presentation threshold, update an electronic programming guide (EPG) entry for the video content instance such that the metadata tag is visually presented as part of the EPG entry;
receive a content search; and
transmit content search results that are indicative of the video content instance, wherein the content search results are based at least in part on the metadata tag being linked with the video content instance in the crowdsourced metadata integration database.

12. The system for voice-based metadata tagging of video content of claim 11, the system further comprising:
a plurality of television receivers, wherein metadata tags are submitted via the plurality of television receivers.

13. The system for voice-based metadata tagging of video content of claim 12, the system further comprising:
a remote control comprising an integrated microphone to capture spoken audio clips and transmit the spoken audio clips to a television receiver of the plurality of television receivers.

14. The system for voice-based metadata tagging of video content of claim 13, wherein the metadata integration server system is configured to update the crowdsourced metadata integration database based on metadata tags submitted by a plurality of content viewers via the plurality of television receivers.

15. The system for voice-based metadata tagging of video content of claim 12, wherein a television receiver of the plurality of television receivers is configured to output the content search results for presentation.

16. The system for voice-based metadata tagging of video content of claim 11, wherein the metadata tag is a spoken metadata tag that was submitted by a content viewer via a microphone.

17. The system for voice-based metadata tagging of video content of claim 13, wherein the television receiver of the plurality of television receiver is configured to:
receive via an EPG interface, a request to add a metadata tag to be linked with the video content instance;
receive, via the integrated microphone, a voice clip, wherein the voice clip comprises audio spoken by a user; and
transmit the voice clip to the metadata integration server system.

18. The system for voice-based metadata tagging of video content of claim 17, wherein the television receiver is further configured to:
receive selection of the video content instance from the content search results; and
in response to the selection of the video content instance from the content search results, output for presentation the EPG entry for the video content instance such that the metadata tag is visually presented as part of the EPG entry.

19. The system for voice-based metadata tagging of video content of claim 11, wherein the metadata integration server system configured to:

determine, for a second metadata tag, that the number of times does not exceed the presentation threshold; and in response to the number of times not exceeding the presentation threshold but exceeding the minimum tag threshold for the second metadata tag, cause the content search results to include a second video content instance mapped to the second metadata tag, but not visually presenting the second metadata tag as part of an EPG entry for the second video content instance.

20. A non-transitory processor-readable medium, comprising processor-readable instructions configured to cause one or more processors of a crowdsourced metadata integration server system to:

update a crowdsourced metadata integration database to link a metadata tag with a video content instance, wherein updating the crowdsourced metadata integration database comprises the crowdsourced metadata integration server system being configured to:

determine a number of times that the metadata tag has been submitted for the video content instance;

determine that the number of times exceeds a minimum tag threshold; and link the metadata tag with the video content instance in response to the number of times being determined to exceed the minimum tag threshold;

determine that the number of times exceeds a presentation threshold; and in response to determining that the number of times exceeds the presentation threshold, update an electronic programming guide (EPG) entry for the video content instance such that the metadata tag is visually presented as part of the EPG entry;

receive a content search; and transmit content search results that are indicative of the video content instance, wherein the content search results are based at least in part on the metadata tag being linked with the video content instance in the crowdsourced metadata integration database.

\* \* \* \* \*